INVENTOR.
ROBERT F. C. VESSOT
BY
Wm J Nolan
ATTORNEY

United States Patent Office 3,462,705
Patented Aug. 19, 1969

3,462,705
COMPENSATION COILS FOR MAGNETIC FLUX LEAKAGE THROUGH HOLES IN MAGNETIC SHIELDS
Robert F. C. Vessot, Marblehead, Mass., assignor to Varian Associates, Palo Alto, Calif., a corporation of California
Filed July 11, 1966, Ser. No. 564,213
Int. Cl. H01s 1/02
U.S. Cl. 331—94    7 Claims

ABSTRACT OF THE DISCLOSURE

An atomic beam maser is disclosed. The maser includes a cavity resonator structure tuned to the atomic resonance frequency of the atomic particles. A bounce box type storage bulb is disposed within the cavity resonator for storage of the atomic particles for electromagnetic interaction with the fields of the cavity to stimulate coherent emission of radiation from the atomic particles. A magnetic shield structure encloses the cavity resonator and storage bulb for shielding the bulb and the atomic particles from extraneously produced magnetic fields and for reducing the magnetic field to a low value representing only a small fraction of the earth's magnetic field. The shield structure includes a beam access aperture through which a beam of atomic particles passes from a source of atomic particles into the storage bulb. A compensating coil structure is disposed at the beam access aperture in the magnetic shield structure. An adjustable current is passed through the compensating coils for cancelling leakage magnetic field tending to leak into the region of the storage bulb through the beam access aperture, whereby the magnetic field inide the magnetic shield structure is compensated for magnetic field leakage through the beam access aperture.

Heretofore, atomic beam masers have been built wherein the maser cavity resonator was shielded from external magnetic fields including the earth's field by a plurality of concentrically disposed magnetic shields surrounding the cavity. The shields were closed at both ends by end closing shield members except for the provision of entrance apertures in one end of the shields to permit passage of the state selected atomic beam into the maser cavity resonator. It was found that these beam entrance apertures impaired the magnetic shielding due to a small amount of magnetic field leakage through the apertures. This leakage flux, although relatively small in comparison to field being shielded did result in producing a small gradient in the magnetic field over the volume of the resonating atoms which tended to broaden the resonance line and reduce the power output and stability of the maser. The shields also had a solenoid inside with separately adjustable currents in the end winding segments. However, the leakage flux could not be properly compensated by the end coils of the internal solenoid. Such a prior maser is described and claimed in copending U.S. application 366,493, filed May 11, 1964, now Patent No. 3,345,581 and assigned to Hewlett-Packard.

In the present invention, a compensating coil is wound around the aperture in an apertured magnetic shield. The current to the coil is made adjustable for producing a compensating magnetic field inside the shield for cancelling the leakage field inside of the shield. It turns out that if the compensating coil is wound around the aperture in the shield the compensating field will approximate the proper configuration to cancel the leakage field without introducing other field components inside the shield which might otherwise produce unwanted gradients or fields inside the shield.

The principal object of the present invention is the provision of an improved means for compensating apertured magnetic shields and improved atomic beam masers using same.

One feature of the present invention is the provision of an electrical coil wound around an aperture in a closed magnetic shield and energized from an adjustable current source for canceling magnetic flux which has leaked into the interior of the shield through the aperture.

Another feature of the present invention is the same as the preceding feature including a second similarly compensated apertured magnetic shield surrounding the first shield.

Another feature of the present invention is the same as any one or more of the preceding features including an atomic maser cavity disposed within the compensated magnetic shield, whereby the field uniformity over the maser region is improved.

Figure 1:
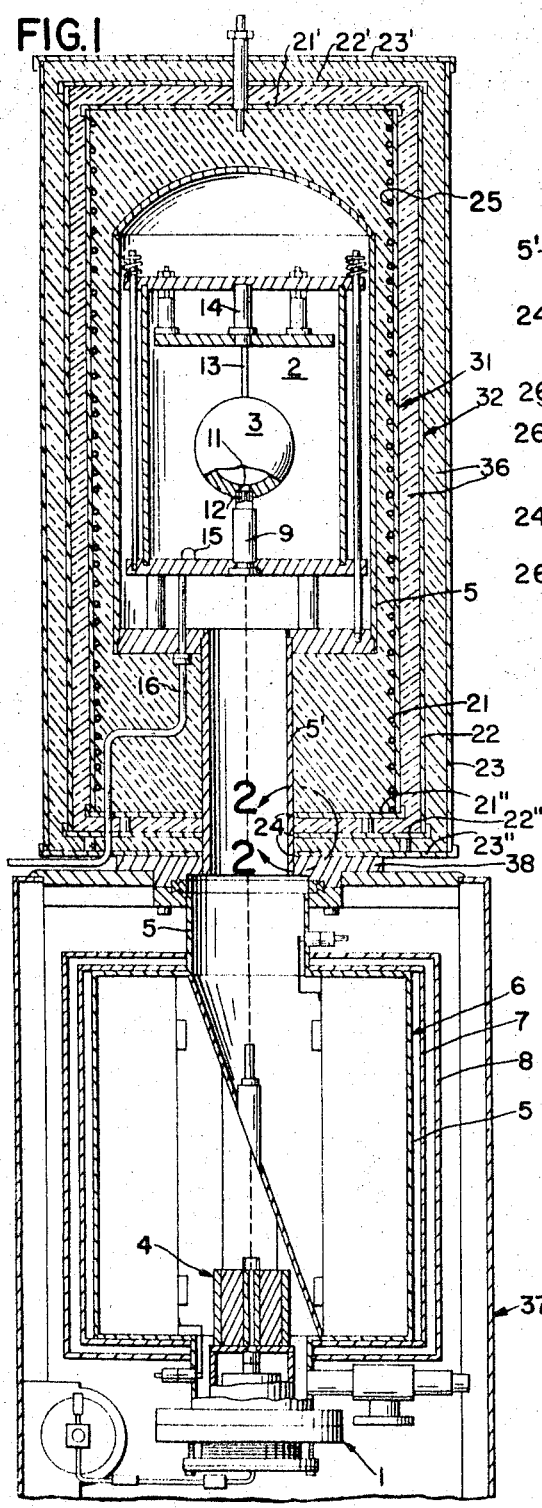
Figure 2:
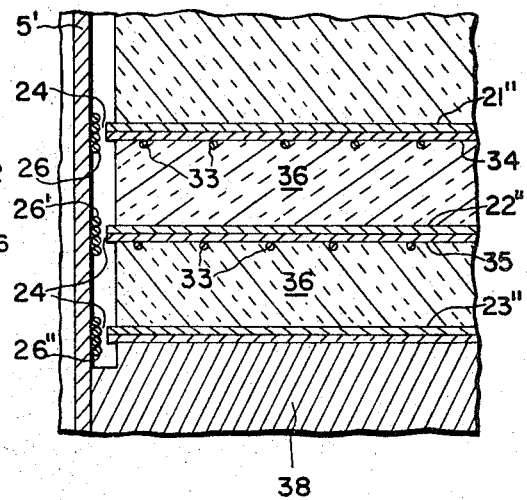
Figure 3:
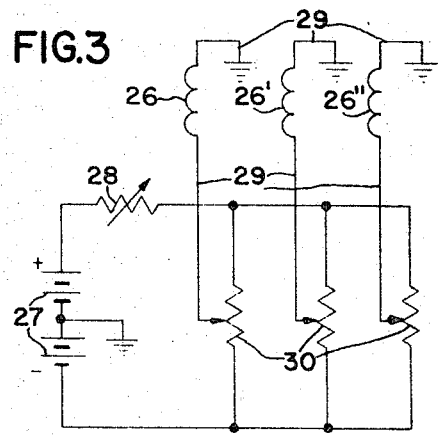

Other features and advantages of the present invention will become apparent upon a perusal of the following specification taken in connection with the accompanying drawings wherein:

FIG. 1 is longitudinal sectional view of an atomic beam maser employing features of the present invention, FIG. 2 is an enlarged sectional view of a portion of the structure of FIG. 1 delineated by line 2—2, and FIG. 3 is a schematic circuit diagram for the compensating coils of FIG. 2.

Referring now to FIG. 1, there is shown in partial cross-sectional view a hydrogen maser apparatus incorporating features of the present invention. The apparatus includes a beam generating device 1 for forming and projecting a beam of atomic hydrogen generally longitudinally of the tube apparatus. A cavity resonator 2 is disposed at the terminal end of the beam path. The cavity resonator 2 contains therewithin a storage bulb 3 or bounce box as of quartz with a non-relaxing wall coating as of Teflon for storing the atomic hydrogen particles for on the order of one second duration before they exit from the bulb 3 through the entrance port. Within the bulb 3 the stored particles undergo a hyperfine transition at about 1420 megacycles giving off coherent spontaneous emission of radiation which is extremely stable in frequency.

A state selecting hexapole magnet 4 is disposed at the up stream end of the atomic beam path for focusing out of the beam the hydrogen atoms that are not in the desired upper hyperfine energy state. An elongated tubular vacuum envelope structure 5 surrounds the cavity and the beam path inbetween the source 1 and the cavity 2. A vacuum pump 6 surrounds the initial portion of the beam path and forms a combined envelope portion and vacuum pump 6. The pump 6 is of the getter ion type described in U.S. Patent No. 2,983,433, issued May 9, 1961.

A pair of magnetic shields 7 and 8 as of 1/16" sheet soft iron and 1/16" sheet Mu metal, respectively, surround the vacuum pump 6 for shielding the cavity 2 from stray magnetic fields produced by the permanent magnets of the pump 6.

The storage bulb 3 is supported within the cavity resonator 2 via the intermediary of a dielectric tube 9 with its axial bore in coaxial alignment with the hydrogen beam path for passage of the beam therethrough. The bulb 3 is provided with an aperture 11 in axial alignment with the tube 9. A multiple hole collimator 12 is disposed in a narrow neck portion of tube 9. Atomic hydrogen beam particles pass through the tube 9, collimator 12, aperture 11 and into the bulb 3.

Within the bulb the beam particles undergo many successive wall collisions as of more than 10,000 before they finally pass out of the bulb via aperture 11, collimator 12 and tube 9. A dielectric support rod 13 is fixedly secured to the bulb 3 and extends away from the bulb 3 in a way that is diametrically opposed to the support tube 9. The dielectric rod 13 is held at its free end in a spring loaded pocket 14 and together with tube 9 supports the dielectric storage bulb 3 within the cavity 2. A coupling loop 15 is formed in the end of a coaxial line 16 which passes into the cavity 2. The loop is coupled to the field of the cavity and serves to extract the output signal of the maser and passes same to a suitable utilization device, not shown.

A plurality of nested, spaced apart, cylindrical magnetic shields 21, 22 and 23 respectively surround the cavity 2 and upper part of the vacuum envelope 5. The magnetic shields serve to shield the bounce box 3 from extraneously produced magnetic fields such as the earth's field. The shields are made of a highly magnetic permeable material such as Mu metal or Permalloy. In a typical example they have diameters of 19.5" 22.5" and 25" and lengths of 42.5", 45.0" and 47.5" respectively and shields 21, 22 and 23 are made of 0.025" thick Permalloy. The cylindrical shields include end closing covers 21', 22' and 23' made of 0.025" Permalloy. The lower covers 21", 22" and 23" are centrally apertured at 24 to permit passage of the narrow neck portion of the vacuum envelope at 5' which is approximately 5.5" in diameter and through which the atomic beam enters the cavity 2 and storage bulb 3.

A polarizing magnetic field solenoid 25 is wound adjacent the inside of the innermost magnetic shield 21 on a cylindrical coil form of aluminum, not shown. The solenoid 25 consists of single layer of turns of insulated copper wire with the end turns of the solenoid 25 disposed immediately adjacent the end closing magnetic covers 21' and 21" of the inner magnetic shield 21 in order to minimize undesired end effects (inhomogeneities in the magnetic field of the solenoid due to the finite length of the solenoid) of the solenoid.

The solenoid 25 is split into three separately energizable sections including a central section and a pair of end sections. The central section contains a preponderance of the turns of the solenoid as of 90% while each of the end sections contain as of 5% of the turns of the composite solenoid 25. Separate control over the ampere turns and direction of current flow of the end sections is obtained via potentiometers, not shown.

Three sets of magnetic field compensating coils 26, 26' and 26" are wound around the access openings 24 as shown in FIG. 2. Preferably the coils 26 are wound on the outside of the beam inlet tubulation 5' which passes through the access holes 24. The coils 26 are preferably wound at the perimeter of each hold 24. Separate control of the current through each of the compensating coils 26 is obtained via potentiometers 30 and leads 29 supplied with current from a centertapped battery 27 or similar power supply via variable resistor 28. Leads 29 are twisted together to prevent generation of undesired magnetic field gradients by the current supplied to the compensating coils 26 and the leads 29 are brought into the coils along the side of the inlet beam tube 5'.

The separate control over the separate compensating coils 26 permits compensation and correction for small leakage flux which tends to leak into the shielded enclosure via the access openings 24.

Proper adjustment of the relative ampere turns of the separate compensating coils 26, 26' and 26" is obtained in the following way: The maser is put into operation with the solenoid 25 energized (for a polarizing field of approximately 50 milligauss). With the maser in operation the currents in the compensating coils 26, 26' and 26" are separately adjusted for maximum maser oscillation or resonance amplitude or for operation with minimum flux. The solenoid field is then reduced in magnitude. Successive readjustment of the solenoid and the compensating coils 26, 26' and 26" permits reduction of the polarizing magnetic field produced by the solenoid 25 to less than 10 microgauss with very little gradient.

This fine control over the magnitude and homogeneity of the polarizing magnetic field and leakage field permits substantial enhancement in stability of the maser and reduces the magnitude of the correction to be made to the output frequency to bring it to a standardized value.

A plurality of ovens 31 and 32 surround, respectively, the two inner magnetic shields and cavity 2 for holding the cavity 2 at a constant temperature to render same insensitive to temperature fluctuations in the ambient environment. The innermost oven 31 comprises an insulated twisted bifilar heater wire 33 as of 30 gauge 0.1Ω/ft. resistance wire wound on the outside of a closed cylindrical can 34 at of 0.060" thick aluminum for evenly conducting the heat over the surface of the can 34 to provide an isothermal surface. A second similar isothermal can 35 surrounds the second magnetic shield 22. A thermal insulating material 36 as of Freon blown plastic foam or fiberglass fills the spaces between the isothermal cans 34 and 35 and their next respective surrounding magnetic shield to prevent excessive loss of heat from the areas and to provide thermal lagging. The innermost oven 31 is controlled by temperature sensing devices, not shown, such as thermistors for a constant temperature slightly above the temperature of the outside oven 32. In a typical example the inner oven is set for 45° C. while the outer oven is set for 40° C. Fiberglass insulation material is used to fill the spaces between the envelope 5 and the innermost oven to provide thermal lagging such that rapid thermal fluctuations in the oven 31 are damped out as seen by the envelope 5.

A suitable cabinet 37 surrounds the lower portion of the tube and supports the tube via the intermediary of a heavy flange 38 as of aluminum fixedly secured to a reduced neck portion 5' of the vacuum envelope 5.

The magnetically shielded polarizing magnetic field solenoid 25 with end compensating coils 26, 26' and 26" has been explained in detail as used for an atomic hydrogen maser. However, its usefulness is not limited to hydrogen masers but is useful for atomic beam tubes in general. For example, it is directly applicable to other atomic resonant beam tubes such as cesium beam tubes or thallium beam tubes of the type described in U.S. patent application 233,573, filed Oct. 29, 1962, now issued as U.S. Patent 3,323,008 on May 30, 1967, and titled "Atomic Beam Apparatus," inventors Joseph H. Holloway et al. and U.S. application 366,493, filed May 11, 1964 and now Patent No. 3,345,581. U.S. Patent 3,323,008 is assigned to the same assignee as the present invention and U.S. Patent 3,345,581 is assigned to Hewlett-Packard. In the case of the latter type of atomic beam tubes, the shielded solenoid 25 is used for providing a uniform axially directed polarizing magnetic C field region.

The atomic resonance tube apparatus, previously described, is not limited to cesium or hydrogen atoms alone. Certain other isotopes of other metals such as, for example, thallium and rubidium may be used. Any electron re-orientation transition or resonance in atoms or molecules for which the net atoms or molecules angular momentum, $f$, is an integer in quantum units of Planks constant, $h$, may be used. In general, it is contemplated any suitable molecular or atomic beam or assemblage having desired resonance characteristics may be used. The terms "atom or atomic particle" as used herein is defined to mean molecules as well as atoms.

Since many changes could be made in the above construction and many apparently widely different embodiments could be made without departing from the scope thereof, it is intended that all matter contained in the above description or shown in the accompanying drawings shall be interpreted as illustrative and not in a limiting sense.

What is claimed is:

1. A magnetic shield apparatus including, means forming a magnetically permeable enclosure for shielding the interior region thereof from external magnetic fields and having an aperture in the wall of said enclosure which has a radius less than half the radius of said enclosure for access to the interior of said enclosure and permitting magnetic flux to leak into said enclosure through the aperture, a conductive coil wound around the aperture and located within one radius of the perimeter of said aperture, and means for energizing said coil with a variable current for producing an adjustable magnetic field component within said enclosure to cancel the magnetic flux leakage, whereby the magnetic field inside said enclosure is compensated for magnetic field leakage through the access aperture.

2. The apparatus of claim 1 wherein said magnetic shielding enclosure is cylindrical having transverse end closing magnetically permeable plate members, and wherein the access opening is located on the axis of revolution at one end of said cylindrical enclosure.

3. The apparatus of claim 2 wherein said enclosure means is a double wall structure having a first enclosing wall structure surrounding and spaced from a second enclosing wall structure.

4. The apparatus of claim 3 wherein said first coil is wound around the aperture in said first enclosure and including a second coil wound around the aperture in said second enclosure, and means for energizing said second coil with an adjustable current for adjusting the compensating field produced by said second coil.

5. The apparatus of claim 3 including in combination, means forming a cavity resonator contained within said shielding enclosure for containing an ensemble of gaseous atoms and for electromagnetically interacting with said atoms to produce a resonance output signal therefrom, and means forming a gas passageway leading into said cavity resonator through the access aperture in said enclosure for supplying gaseous atoms to said cavity resonator to sustain the output signal.

6. The apparatus of claim 1 wherein said coil is located substantially at the perimeter of said access aperture.

7. The apparatus of claim 5 wherein said coil is located substantially at the perimeter of said access aperture.

References Cited
UNITED STATES PATENTS

| | | | |
|---|---|---|---|
| 3,255,423 | 6/1966 | Ramsey et al. | 331—94 |
| 3,323,009 | 5/1967 | Holloway | 331—94 X |

ROY LAKE, Primary Examiner

SIEGFRIED H. GRIMM, Assistant Examiner

U.S. Cl. X.R.

330—4; 331—67